UNITED STATES PATENT OFFICE.

VIKTOR GERBER, OF ZURICH, SWITZERLAND.

PROCESS OF PRODUCING ALUMINIUM FROM ALUMINIC OXID.

1,350,150.      Specification of Letters Patent.     Patented Aug. 17, 1920.

No Drawing.     Application filed January 28, 1920.   Serial No. 354,642.

*To all whom it may concern:*

Be it known that I, VIKTOR GERBER, a citizen of the Republic of Switzerland, residing at Zurich, Sihlquai 55, Switzerland, have invented new and useful Improvements in Processes of Producing Aluminium from Aluminic Oxid; and I do hereby declare the following to be a clear, full, and exact description of the invention, such as will enable others skilled in the art to which it appertains to make and use the same.

The industrial production of aluminium is carried out by electrolysis of a solution of pure aluminic oxid in molten cryolite. The dimensions of the bath are, as is the case with the baths of the electrolysis for alkaline hypochlorites, limited by the requirements of interchanging the anodes, to adjust same easily and to be able to conveniently add aluminic oxid and cryolite. In consequence of the small capacity of the single baths (furnaces) a great number thereof is required which causes great losses through radiation of heat and moreover much room is taken up by the cells. The thermal efficiency of a single bath is therefore very low, at the utmost 20% of the theoretical amount. In view of these circumstances experiments have been carried out to convert aluminic oxid into aluminium by thermal methods, which can be done in employing a reducing agent such as carbon in a large arc-furnace as is used now-a-days in manufacturing calcium carbid or ferrosilicon. These furnaces do not need to be connected up to direct current but may be worked with the cheaper and easier procurable alternating current. But with this electro-thermal method it is difficult to avoid the aluminium which is generated in a vaporous state from encountering the colder parts of the mixture of carbon and aluminic oxid and form with the carbon aluminium-carbid. This difficulty is overcome in the present invention.

The new process consists in supplying the necessary electric energy for the reduction and in treating pure aluminic oxid in a liquid or molten state with carbon and hydrogen or with compounds or mixtures of these two elements. The process may be carried out by blowing pure carbon finely divided (dust) mixed with hydrogen or with a gas containing carbon and hydrogen or hydrogen by itself into the melt of alumina or in sucking it through the molten mass.

When using liquid hydrocarbons they are suitably brought into contact with the molten alumina in the vaporous state.

The process according to this invention may be carried out in an open or closed, resistance- or arc-furnace. The required pure liquid aluminic oxid can also be produced in a second furnace which may as well be of the open or inclosed, resistance- or arc-type. Inclosed furnaces may also be worked with a pressure below the atmospheric. The molten aluminic oxid may also be caused to flow in an atmosphere of hydrogen across carbon of a large surface which is kept at a high temperature by means of a supply of electric energy. In both cases the produced distillate of aluminium is prevented from coming into contact with a layer of carbon, and any carbid that may have formed can be reduced with superfluous liquid aluminic oxid to aluminium. The escaping mixture of gas is chilled at a cooled down part of the furnace.

The condensation and precipitation of the aluminium may be accelerated in providing an electrically unidirected high-tension field.

I claim:

1. The process of producing aluminum, which comprises forming a melt of alumina, subjecting the same to reduction by the action thereon of carbon and hydrogen and supplying electric energy for the reduction.

2. The process of producing aluminum, which comprises forming a melt of alumina and subjecting the same to reduction by the action of carbon and hydrogen thereon while supplying electric energy for the reduction and condensing the resulting metal fume.

3. The process of producing aluminum, which comprises forming a melt of alumina and subjecting the same to reduction by the action of carbon and hydrogen thereon while supplying electric energy for the reduction and condensing the resulting metal fume under the action of a unidirectional electric field.

4. The process of producing aluminum, which comprises passing through a melt of alumina a reducing agent containing only carbon and hydrogen while supplying electric energy for the reduction.

5. The process of producing aluminum, which comprises reducing a melt of alumina by a reducing agent comprising finely divided carbon and hydrogen while supplying electric energy for the reaction.

6. The process of producing aluminum, which comprises reducing a melt of alumina by a reducing agent comprising finely divided carbon, a hydrocarbon and hydrogen while supplying electric energy for the reaction.

7. The process of producing aluminum, which comprises forming a melt of alumina, and passing through said melt a reducing agent containing carbon and hydrogen while supplying electric energy for the reaction.

8. The process of producing aluminum, which comprises forming a melt of alumina, and passing through the melt a gaseous reducing agent comprising a hydrocarbon and hydrogen while supplying electric energy for the reduction.

9. The process of producing aluminum, which comprises liquefying alumina by heat and passing the melt so obtained over carbon heated to a high temperature and in an atmosphere of hydrogen, and supplying electric energy for maintaining said heat and for the reduction.

In testimony that I claim the foregoing as my invention, I have signed my name.

VIKTOR GERBER.